March 7, 1950  A. C. ROCKWOOD ET AL  2,499,976
ACID DISPENSER
Filed Nov. 8, 1948  3 Sheets-Sheet 2
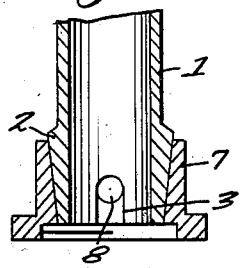
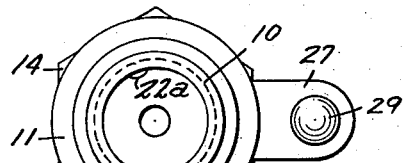
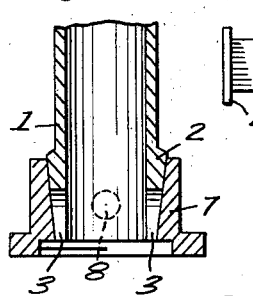
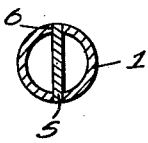
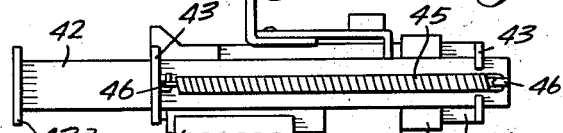
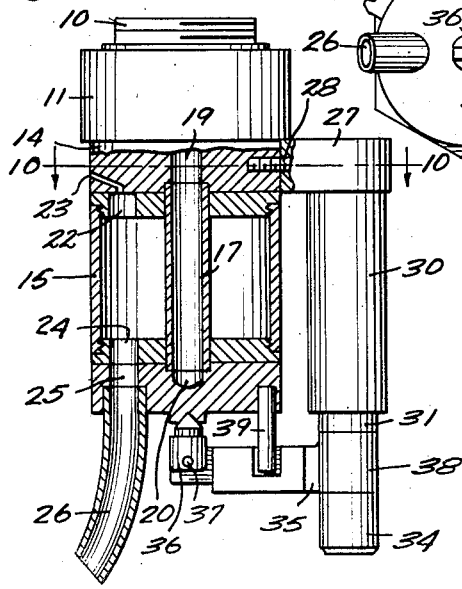
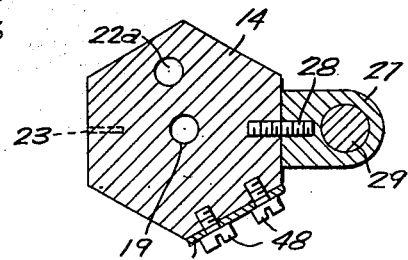
INVENTOR.
Arthur C. Rockwood,
Burton E. Hill,
BY Victor J. Evans & Co.
ATTORNEYS

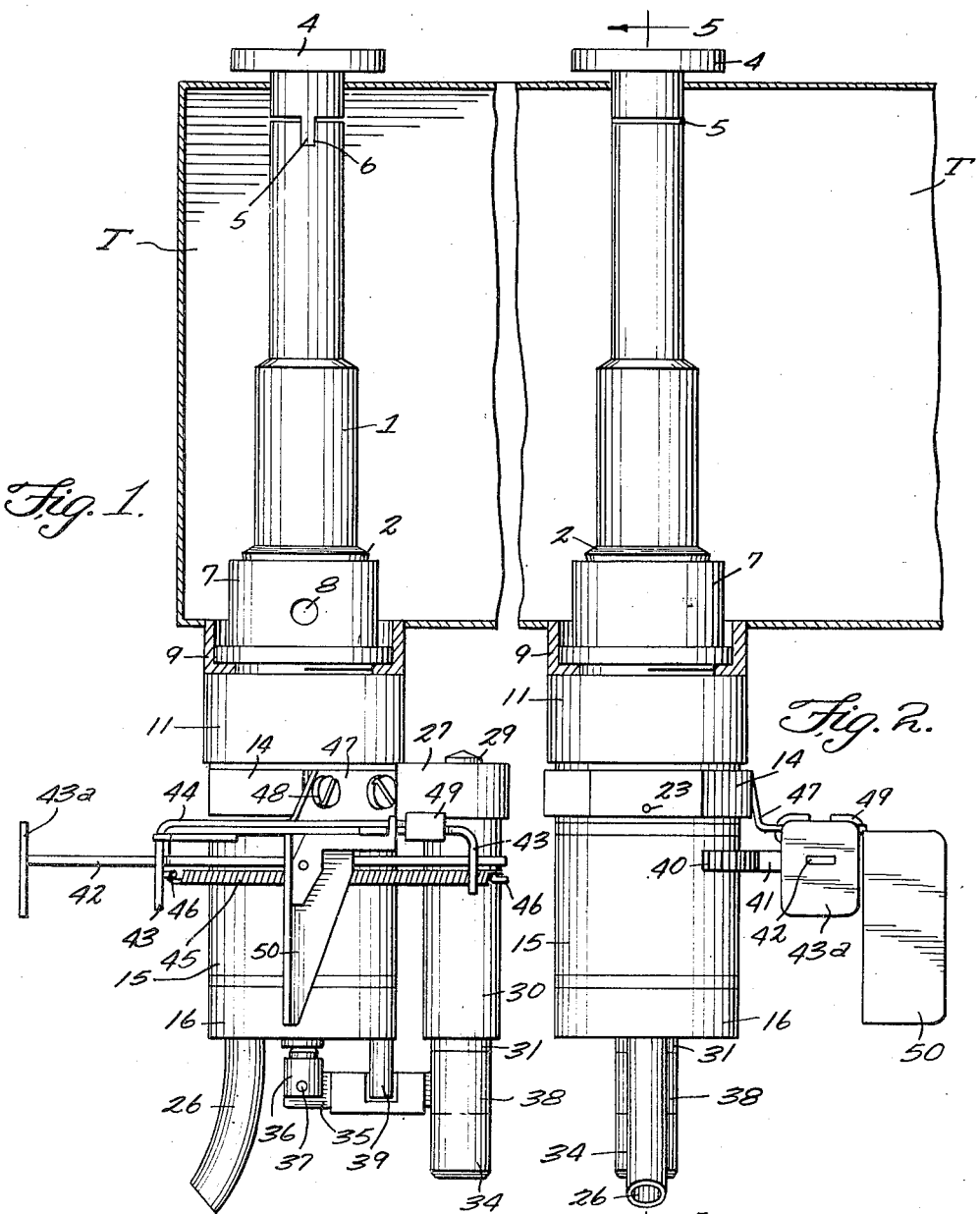

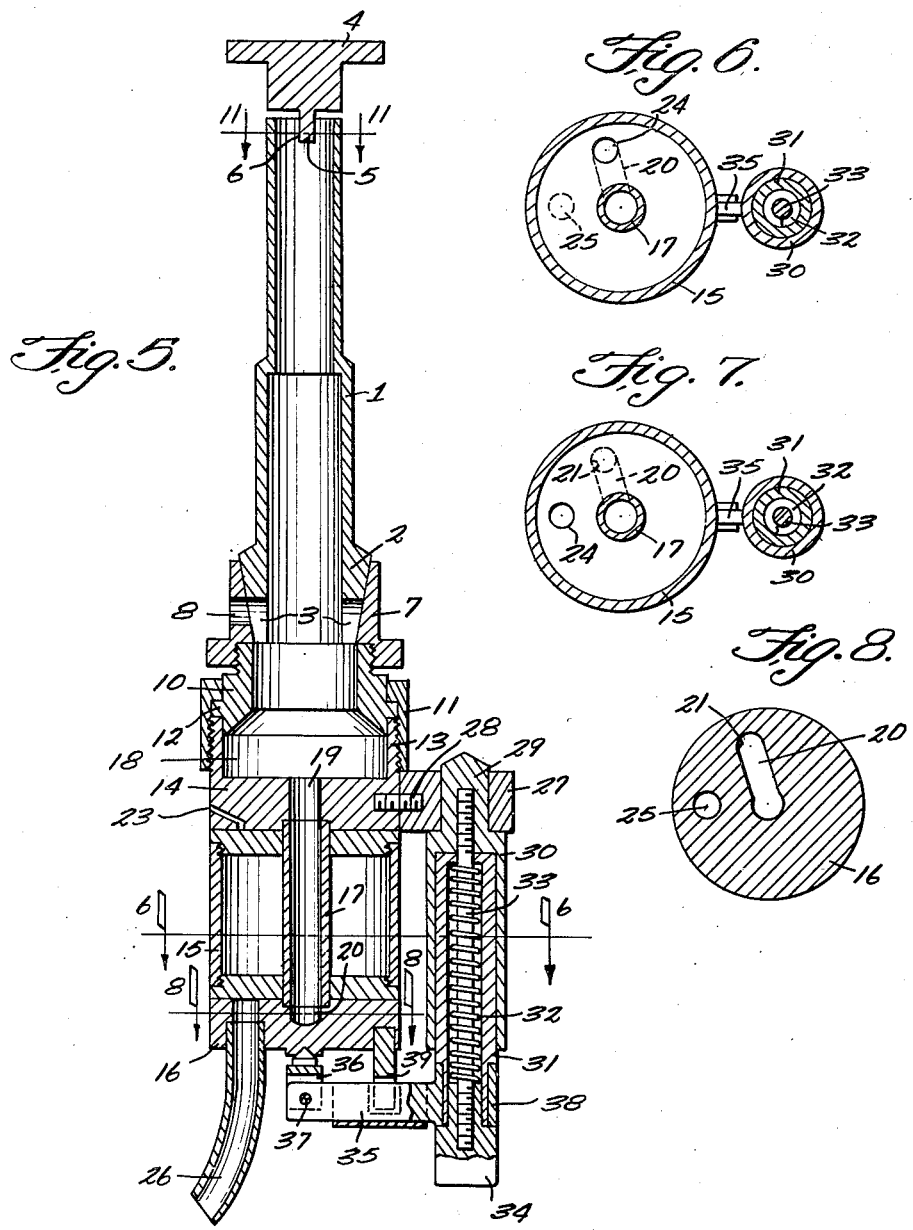

Patented Mar. 7, 1950

2,499,976

UNITED STATES PATENT OFFICE 2,499,976

ACID DISPENSER

Arthur C. Rockwood, Wisconsin Rapids, and Burton E. Hill, Pewaukee, Wis.

Application November 8, 1948, Serial No. 58,986

4 Claims. (Cl. 222—338)

The present invention relates to the general class of gravity discharge dispensers of the rotatable conveyor trap and measuring chamber type having axial inlet and outlet, and more specifically to an improved automatic acid dispenser which while well adapted for measuring and dispensing various liquids as well as fine granular solids, is especially designed for use in creameries, cheese factories, and condenseries when making the Babcock test for cream contained in milk.

The primary purpose of the invention is the provision of an appliance of this type that will accurately measure and quickly dispense predetermined quantities of the liquid to insure uniformity in the tests, and perform these tests in a sanitary manner without waste of the acid. The device of our invention includes a minimum number of parts that may with facility be manufactured with low cost of production, and the parts may be assembled with convenience to assure a manually controlled appliance that is simple in construction and operation and reliable in the performance of its functions.

The invention consists in certain novel combinations and arrangements of parts as will hereinafter be described and more particularly set forth in the appended claims.

In the accompanying drawings we have illustrated a complete example of a physical embodiment of our invention wherein the parts are combined and arranged in accord with one mode we have devised for the practical application of the principles of our invention. It will however be understood that changes and alterations are contemplated and may be made in these exemplifying drawings and mechanical structures, within the scope of our claims, without departing from the principles of the invention.

Figure 1 is a view in elevation of the dispensing appliance embodying our invention, showing in section a portion of a supply tank; and Figure 2 is a similar view as seen from the left in Fig. 1.

Figure 3 is a top plan view, with parts removed, showing the operating means for partially rotating the dispensing bowl; and Figure 4 is a similar view of the bottom of the dispenser.

Figure 5 is a vertical section view of the dispensing appliance; and Figure 6 is a transverse sectional view at line 6—6 of Fig. 5.

Figure 7 is a transverse sectional view through the rotary dispensing bowl; and Figure 8 is a transverse sectional view through the base of the bowl-holder, as at line 8—8 Fig. 5.

Figure 9 is a vertical detail sectional view showing the bowl turned to discharging position; and Figure 10 is a horizontal sectional view at line 10—10 of Fig. 9.

Figure 11 is a transverse sectional view of a portion of the cut-off valve; and

Figures 12 and 12a are detail sectional views showing the feed control valve in open and closed positions respectively.

In order that the general relation and utility of parts may readily be understood, we have shown in Figs. 1 and 2 portions of a container or tank T from which the liquid is supplied, and the tank forms a support for the dispensing appliance which is located in position for manual operation. The feed of liquid to the dispensing appliance is controlled by a cut-off valve mounted in the tank and provided with an upright tubular stem 1 having on its lower end a rotary tapered plug valve 2 that is fashioned with diametrically arranged ports 3, 3. From the exterior of the tank the cut off valve may be adjusted, opened, and closed by means of a hand knob 4 having a coupling blade or lug 5 that is seated in sockets or slots 6 in the upper end of the tubular stem.

The hollow valve is seated and rotatable in a flanged cup or casing 7 that is provided with an inlet port 8 from the interior of the tank, with which the valve ports 3 are adapted to register, and the cup with port 8 is located in a bottom sump or depression 9 of the tank. The valve cup or casing 7 is threaded on the top of a nipple 10 exterior of the bottom of the tank, and forming part of the dispensing appliance.

The appliance is thus suspended from the bottom of the tank, and a flanged lock nut 11 is engaged over an exterior flange 12 of the nipple 10 and threaded on the exterior of a flange 13 for securing the upper head 14 of the holder for the partially rotatable or oscillatable bowl 15 of the dispenser.

The closed, but ported cylindrical bowl is detachably mounted in its holder, for cleansing purposes and adjustment, and it is designed to receive and dispense a predetermined charge or quantity of the liquid from the tank, and for this purpose the bowl is rotatably mounted between the fixed head 14 of the holder, and a vertically spaced base 16 of the holder, which base is detachable or removable for installing or for withdrawing the bowl.

The bowl is rotatably mounted between the head and the base by means of an axial or central feed tube 17 that is rigidly mounted within the bowl, the projecting ends of which form journals or trunnions seated in complementary sockets in the under face of the head and the upper face of the base.

The upper flange 13 of the head forms a feed chamber 18 that is supplied from the ported cut off valve, and the head has a central port 19 alined with the interior of the feed tube 17, which tube at its lower end opens into a radial duct 20 of the base 16, and the outer end of the duct opens through port 21 beneath the closed bottom of the bowl.

The bowl is alternately filled and discharged, and for venting its interior a port 22 is provided in the upper head of the cylindrical bowl that is adapted to register with an air duct 23 in the holder-head 14, or with another port 22a of the head that is open to the atmosphere, the ports 23 and 22a of course being alternately opened and closed by the partially rotatable bowl.

For discharging or delivering the measured content of the bowl, the lower circular head of the bowl is equipped with an outlet port 24 that is adapted to register with a complementary outlet port 25 in the base 16 of the holder, and a delivery nozzle 26 is attached to the base for receiving and dispensing the liquid from the ported parts.

The dispensing bowl with its feed tube as a unit is separable from the holder, as for cleansing purposes, and means are provided whereby the base 16 is employed as a clamping element of the holder for retaining the bowl in rotatable position in the holder. For this purpose the base 16 is resiliently supported in clamping position beneath the bowl and suspended from the fixed head 14 of the holder by means of a suspending, open-center lug or bracket 27 that is fixed on the head 14 by threaded stud bolt 28. The open-center lug provides a socket member for the upper reduced end 29 of a cylindrical barrel or casing 30, which is open at its lower end to receive a telescoping sleeve 31 that is closed at its upper inner end, and an expansion spring 32 mounted in the spring sleeve is coiled about a spring rod or bolt 33 which is threaded at its upper end in the stud 29 of the barrel 30.

The lower end of the spring bears upon a reduced boss of a hand knob 34, and the lower end of the spring bolt, or rod is threaded into a socket of the knob, so that the barrel and the sleeve may be adjusted and increase or decrease the tension of the spring.

For retaining the base, which clamps the bowl in operative position, a horizontally extending arm 35, having a pointed clamping head 36 that is pivoted on the arm at 37, is provided with a coupling sleeve 38 that surrounds the lower reduced end of sleeve 31, and the knob 34 supports the sleeve 38.

To hold the supporting arm against lateral movement a forked guard or brace 39, fixed to the base 16 in suitable manner straddles the arm to insure a rigid pin and socket joint between the pivoted head 36 and the base 16.

In order to remove the bowl from its holder, the knob 34 may be turned so that the base 16 may be lowered, or the telescoping sleeve and arm 35 may be depressed against the tension of the spring to drop the base so that the trunnion ends of the bowl may be removed from their sockets and the bowl withdrawn from the holder. With the arm 35 lowered, the bowl may be replaced in its holder and the spring clamps the bowl between its head and base to seal the ports against escape of the liquid from the bowl.

For partially rotating the filled bowl on its axial center to dispensing position, and for automatically retracting bowl to filling position, the bowl is equipped with an exterior arcuate toothed rack or segmental rack gear 40 soldered or welded, or otherwise secured on the bowl, and a rack bar 41 rigid with a horizontal slide plate 42 having a knob or pushing head 43a co-acting with the segmental gear for turning the bowl a predetermined distance to cut off the supply to the bowl and to permit a gravity discharge of a measured quantity from the bowl through the discharge nozzle 26.

The reciprocable slide plate 42 is mounted in spaced end flanges 43 of a supporting guide 44, and a spring 45 for retracting the bowl to filling position is anchored to one end flange 43 and attached to the slide at 46.

The slide holder or supporting guide is attached to the fixed head 14 of the bowl-holder by means of a bracket 47 and attaching screws 48, which bracket is equipped with retaining lugs as 49 for the slide, and a finger plate 50 for use when the slide is being manipulated by thumb pressure against the pushing head 43.

Having thus fully described our invention, what we claim as new and desire to secure by Letters Patent is:

1. In the dispensing device described, the combination with a holder including a ported head having a feed chamber, and a base having an outlet port and discharge nozzle, of a bowl having an axial feed tube open to the ported head and open to a ported duct in the base, said tube having its ends rotatably journaled in the head and base and said bowl having an outlet port adapted for alternate registration with the outlet port and ported duct of the base, manually operated means for turning the bowl to dispensing position, and means for retracting the bowl to filling position.

2. The dispensing device as in claim 1 wherein a segmental gear is mounted on the bowl and a rack bar is slidably mounted on the holder for engagement with the gear and the manually operated means is adapted to actuate said rack bar for the turning of the bowl.

3. The dispensing device as in claim 1 wherein the means for retracting the bowl to filling position comprises a spring device rigid with the holder.

4. In a dispensing device as described, the combination with a holder including a fixed head and a movable base and inlet and outlet means for the holder, and a ported bowl rotatably mounted between the head and base, of a clamp-arm coupled with the base, a barrel rigid with the fixed head, a telescopic sleeve mounted in the barrel and united with the arm, an adjusting nut mounted for rotation in the sleeve for retaining the arm thereon, a tie bolt having its ends threaded in the barrel and the nut, and a spring coiled about the tie bolt and interposed between the sleeve and the nut.

ARTHUR C. ROCKWOOD.
BURTON E. HILL.

REFERENCES CITED

The following references are of record in the file of this patent:

UNITED STATES PATENTS

| Number | Name | Date |
|---|---|---|
| 1,879,109 | Coy | Sept. 27, 1932 |
| 2,209,766 | Dale et al. | July 30, 1940 |